United States Patent  (10) Patent No.: US 11,087,615 B2
Elliott et al.  (45) Date of Patent: Aug. 10, 2021

(54) VIDEO/SENSOR BASED SYSTEM FOR PROTECTING ARTWORK AGAINST TOUCH INCIDENTS

(71) Applicant: ACUITY-vct, LLC, Westlake, OH (US)

(72) Inventors: Michael Lawrence Elliott, Westlake, OH (US); Daniel Joseph Lazuta, Akron, OH (US); Randolph Allen Stankie, Brecksville, OH (US)

(73) Assignee: ACUITY-VCT, LLC, Westlake, OH (US)

(*) Notice: Subject to any disclaimer, the term of this patent is extended or adjusted under 35 U.S.C. 154(b) by 0 days.

(21) Appl. No.: 16/899,911

(22) Filed: Jun. 12, 2020

(65) Prior Publication Data

US 2020/0394902 A1 Dec. 17, 2020

Related U.S. Application Data

(60) Provisional application No. 62/861,613, filed on Jun. 14, 2019.

(51) Int. Cl.
| | |
|---|---|
| *H04N 7/18* | (2006.01) |
| *G08B 29/18* | (2006.01) |
| *G08B 13/196* | (2006.01) |
| *G06T 7/20* | (2017.01) |

(52) U.S. Cl.
CPC ............ *G08B 29/186* (2013.01); *G06T 7/20* (2013.01); *G08B 13/19602* (2013.01); *G08B 13/19641* (2013.01); *G08B 13/19656* (2013.01); *G06T 2207/10016* (2013.01); *G06T 2207/20081* (2013.01); *G06T 2207/20084* (2013.01); *G06T 2207/30232* (2013.01)

(58) Field of Classification Search
CPC ............ G08B 29/186; G08B 13/19641; G08B 13/19602; G08B 13/19656; G06T 7/20; G06T 2207/10016; G06T 2207/20081; G06T 2207/20084; G06T 2207/30232
USPC ...................................................... 348/154
See application file for complete search history.

(56) References Cited

U.S. PATENT DOCUMENTS

| | | | | |
|---|---|---|---|---|
| 7,233,948 | B1* | 6/2007 | Shamoon | H04N 21/234318 |
| 7,974,714 | B2* | 7/2011 | Hoffberg | H04N 7/163 |
| | | | | 700/94 |
| 9,202,323 | B2* | 12/2015 | Queenan | G07C 9/00571 |
| 2016/0189527 | A1* | 6/2016 | Peterson | G08B 25/008 |
| | | | | 340/541 |

\* cited by examiner

*Primary Examiner* — Shan E Elahi
(74) *Attorney, Agent, or Firm* — Fay Sharpe LLP (57) ABSTRACT

A computer-implemented method for protecting objects monitors a zone in which at least one object is held. The method uses input that it acquired from at least one monitor in communication with a server computer performing the method. Subzones are determined within the zone. Each object is associated with and/or belongs to a subzone. The method monitors the zone for an incident. This monitoring is performed across a series of images. In response to an incident being detected within a subzone, the object belonging to the subzone is identified. An alarm output is generated that is unique to the object. The output is transmitted to an output device in communication with the server computer.

19 Claims, 4 Drawing Sheets

VIDEO/SENSOR BASED SYSTEM FOR PROTECTING ARTWORK AGAINST TOUCH INCIDENTS

This application is based on and claims priority to U.S. Provisional Application No. 62/861,613, filed Jun. 14, 2019, which is incorporated herein by reference in its entirety.

BACKGROUND

The present disclosure is directed to an object protection system. It finds particular employ in a place in which one or more valuables are stored and exhibited and are susceptible to physical contact and/or tampering from viewers of the valuable(s). However, it is to be appreciated that the present exemplary embodiment is also amenable to other like applications.

Facilities, such as museums, want visitors to be able to get close to treasures, but they must balance this desire with the need to prevent valuable objects (artwork, artifacts, etc.) from being touched. However, these objects may still be displayed in a way that make them susceptible to touch, damage and/or theft. This makes their protection a difficult and delicate task.

These facilities desire that visitors have an enjoyable, insightful, and stress-free visit. Some will station guards nearby the objects to deter visitors from touching them; however, the presence of guards often causes stress and detracts from the visitor experience. Facilities can also use a video surveillance system to record evidence of tampering. Conventional surveillance systems employ one or more cameras to monitor collections that are accessible to the public for viewing. While conventional video surveillance is a theft deterrent, due to the known presence of a camera(s) in the area, it is not effective against preventing unintentional damage that accompanies intentional touch (i.e., contact that stems from curiosity). Additionally, when touches are observed by guards, the guards will often confront the individual. This often results in a denial by the visitor and can escalate to a confrontation.

Approximately 98% of touch incidents go unreported, and any resulting damage may go unnoticed for days to years. Recently, RFID chips were introduced for providing additional means of object protection. These chips may signal an alarm if an object is moved, but they do not activate if the object is touched. Motion detectors and laser beams can also be used to activate alarms, but they are difficult to install, maintain, and adjust. Motion-based camera systems are operative to activate alarms when a monitored zone is breached, but the accuracy and ease of use needs improvement. False positives—resulting from changing light conditions, shadows, and reflections—have made them a nuisance.

An object protection system is therefore desired which improves accuracy, signals touch incidents, and provides a local audible alarm which results in a private correction avoiding a confrontation with the guards.

BRIEF DESCRIPTION

One embodiment of the disclosure is directed to a system for protecting objects. The system includes a non-transitory storage device having stored thereon instructions for protecting objects. The system includes at least one hardware processor being part of the server computer and configured to execute the instructions. The processor is operative to acquire at least one image or measurement from at least one monitor in communication with the server computer. At least one monitor monitors a zone in which at least one object is held. The processor is further operative to determine subzones within the zone. Each object belongs to a subzone. The processor is also operative to monitor the zone for an incident. Where the monitor includes a camera, the monitoring is performed across a series of images. In response to an incident being detected within a subzone, the processor is operative to identify the object belonging to the subzone. The system generates an alarm output unique to the object. The processor is operative to transmit the output to an output device in communication with the server computer.

One embodiment of the disclosure is directed to a computer-implemented method for protecting objects at a server computer. The method includes the step of acquiring at least one image or measurement from at least one monitor in communication with the server computer. At least one monitor monitors a zone in which at least one object is held. The method further includes the step of determining subzones within the zone. Each object is associated with and/or belongs to a subzone. The method further also includes the step of monitoring the zone for an incident. In response to an incident being detected within a subzone, the method identifies the object belonging to the subzone. An alarm output is generated that is unique to the object. The method transmits the output to an output device in communication with the server computer.

BRIEF DESCRIPTION OF THE DRAWINGS

For a more complete understanding of the disclosure, reference is now made to the embodiments illustrated in greater detail in the accompanying drawings and described below by way of examples of the disclosure.

DETAILED DESCRIPTION

The present disclosure relates to an object protection system. It finds employ in a place, such as a museum, in which one or more valuables are stored and exhibited and are susceptible to physical contact and/or tampering from viewers in the place.

As used herein, the term "museum" refers to any facility where objects are exhibited. This facility can include, but is not limited to, institutions (or private residences) that procure, care, study, and display objects of interest and value. These institutions include, but are not limited to, museums, historic or heritage sites, cathedrals and other places of worship, and universities, etc. that house special objects.

As used herein, the term "monitor" can mean an image capture device, such as a camera, or a sensor that is operative to capture an input and transmit the input data to a processor in communication with the monitor. In one example, the monitor can be a camera that takes an image (or video) and transmits the captured image data to the processor. In another example, the monitor can be a sensor that takes a measurement of a zone condition and transmits a signal of the measurement to the processor. The captured image data or signal (collectively "input") undergoes processing at a computing device to generate an output that is indicative of the object's environment. The indicator ("output") can be, for example, a visual output (e.g., video, a user-interface, etc.), an audio output (e.g., alarm), a digital output including a graphical signal (e.g., warning light), or the like. The "monitor" referred to herein is a camera in the example embodiment for illustration purposes. However, it is to be understood that "camera' and "sensor" are synonymous and interchangeable terms as used herein.

As used herein, the term "object" refers to artifacts, artwork, statues, furniture, historical items, such as outfits and costumes, and any object of value that is on exhibition or display.

The term "tampering" as used herein refers to any damage to the object or any change in the object condition. "Tampering" encompasses purposeful physical contact with the object from which partial or complete deterioration results. Otherwise, "contact" with an object, as used herein, refers to intentional and unintentional physical (such as, touch) contact with an object. For examples, some persons, unbeknownst to them, may brush against the object as they pass by it. For example, a bag protruding from their person may contact the object. Other nonlimiting examples include instances where patrons touch the object to explore its detail, but with no harm intended.

The damage from these touches can be irrecoverable. For example, a tiny amount of finger pressure on the canvas of an oil painting can cause paint to chip off. The brittle surface of these paintings can be easily damaged in this way. Additionally, oils from the skin can leave residues that build up and/or tarnish or corrode the object material.

Figure 1:
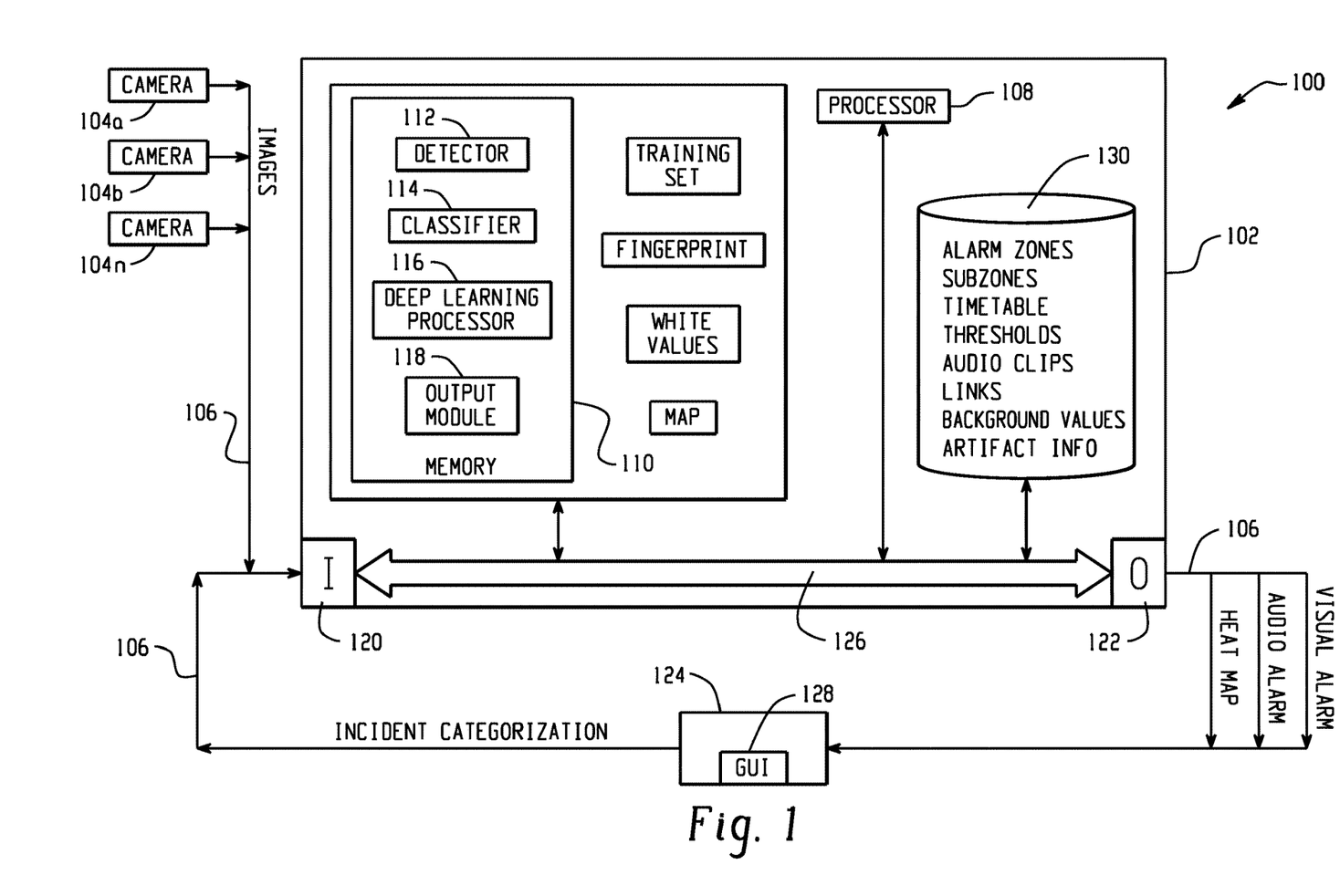
FIG. 1 is a schematic diagram of an artifact protection system according to one embodiment of the disclosure.

FIG. 1 is a schematic illustration of a system 100 for protecting a collection of objects according to one aspect of the exemplary embodiment. The system 100 may include a processing system, hosted by a computing device 102 such as a digital front end ("DFE") or controller and at least one monitor (such as sensor or camera 104a, . . . n) which are linked together by communication links 106, referred to herein as a network. These components are described in greater detail below.

The computing device 102 illustrated in FIG. 1 includes a processor 108, which controls the overall operation by execution of processing instructions, which are stored in memory 110 connected to the processor 108.

The image processing operation disclosed herein is performed by the processor 108 according to the instructions stored in the memory 110. In particular, the memory 110 stores a detector 112; a classifier 114; a deep learning processor 116 such as a neural network; and an output module 118. These modules 112-118 will be later described with reference to the exemplary method. In general, the modules 112-118 take an instruction and input from at least one monitor 104a, . . . n and process the input at the computing device 102, particularly for improving the surveillance and protection of objects against touch or contact-induced tampering and damage.

The computing device 102 includes one or more communication interfaces (I/O), such as network interfaces 120, 122 for communicating with external devices, such as output device 124. The various hardware components 108, 110 (including random access memory "RAM") of the computing device 102 may all be connected by a bus 126.

With continued reference to FIG. 2, the computing device 102 is communicatively linked, via wired or wireless link, to an output device 124. In one embodiment, the output device 124 includes at least one speaker for playing an audible alert. The output device 124 can be located in the area in which the zone is located, or it can be located in a control room, or it can be a mobile device. In the contemplated embodiment, the output device 124 is a computing device including a graphic user interface (GUI) 128. In various embodiments, the GUI 128 may include one or more of a visual display device, for displaying information to users, or audio display device, such as a speaker, for relaying audio output, and a user input device, such as a keyboard or touch or writable screen, for inputting instructions and/or receiving predetermined freeform zone parameters, and/or a cursor control device, such as a mouse, trackball, or the like, for communicating user input information and command selections to the processor 108. Specifically, the GUI 128 includes at least one of an input device and an output device, both of which include hardware, and which are communicatively linked with the computing device 102 via wired and/or wireless link(s).

As mentioned, the computing device 102 of the system 100 is communicatively linked with the monitor. While the computing device 102 can be linked to as few as two cameras 104a-b or sensors, there is no limitation made to the number of, or combination of, cameras and sensors employed by the system. A camera can be any suitable image capture device that is operable to capture still images or image frames (i.e., video). A sensor can be any suitable sensor operative to monitor a change in condition. One example sensor can be a Lidar sensor or radar detector.

In an illustrative embodiment, two categories of cameras are employed in the system 100. At least one high resolution surveillance camera 104 (such as, a "motion detection video camera") monitors the entire zone (hereinafter referred to as "region of interest"). This camera records when triggered by observed motion and monitors persons as they move about the space where objects are on exhibit. Camera(s) 104 captures the space in the field of view and, more particularly, a zone being the entire space or being defined within the space. Typically, every space is monitored by at least two video cameras 104a, 104b from opposing angles or corners of the space. The cameras 104a, 104b can be arranged in a position that sufficiently captures every object—to be monitored—within the field of view and without obstruction from humans or interference from background movement. These cameras 104a, . . . n may be high-resolution so that object detail is easily viewable in the video data.

The cameras 104a, . . . n are each adapted to capture a sequence of image frames and transmit the image/video data to the computing device 102, which processes and stores the data. In the contemplated embodiment, the cameras 104a, . . . n can further be used for collecting and providing reviewable evidence of contact incidents, but the purpose of the system 100 is not limited to any one application. In the contemplated embodiment, additional processing can be performed on the video data to automate the classifying and/or categorizing and/or verifying of a suspected incident using the video data.

The memory 110 may represent any type of tangible computer readable medium such as random-access memory (RAM), read only memory (ROM), magnetic disk or tape, optical disk, flash memory, or holographic memory. In one embodiment, the memory 110 may each comprise a combination of random-access memory and read only memory. The digital processor 108 can be variously embodied, such as by a single-core processor, a dual-core processor (or more generally by a multiple-core processor), a digital processor and cooperating math coprocessor, a digital controller, or the like. The digital processor(s) 108, in addition to controlling the operation of the computing device 104, executes instructions stored in the modules 112-118 for performing the parts of the method outlined below.

The software modules 112-114 as used herein, are intended to encompass any collection or set of instructions executable by the system 100 to configure the system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 120, 122 may include, for example, a modem, a router, a cable, and and/or Ethernet port, etc.

As will be appreciated, while computing device 102 and monitors 104a, . . . n are illustrated by way of example, the system 100 may be hosted by fewer or more linked computing devices. Each computing device may include, for example, a server computer, desktop, laptop, or tablet computer, smartphone or any other computing device capable of implementing the method described herein. Alternatively, the computing device 102 can be incorporated in the monitor 104.

Figure 2A:
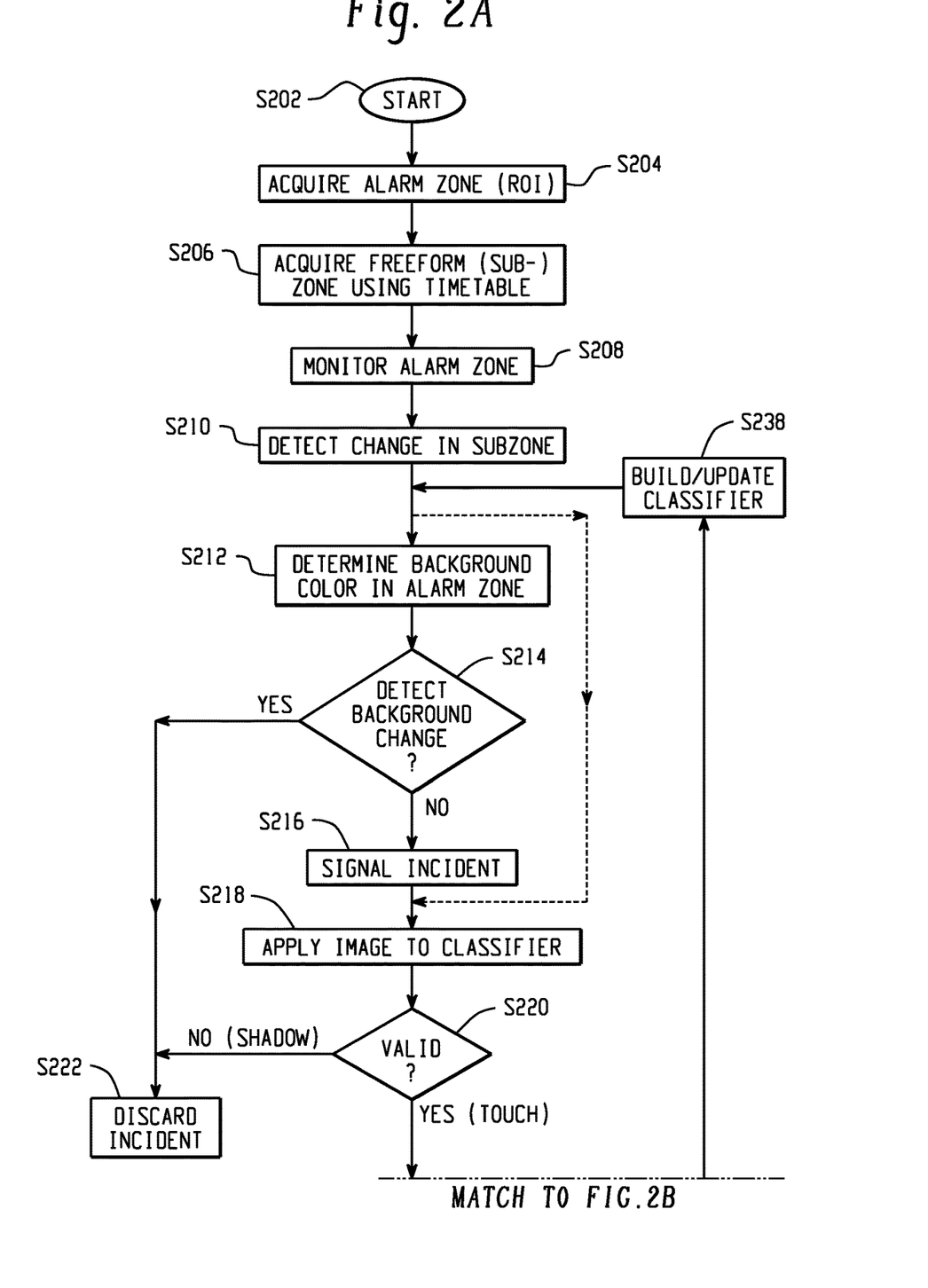
FIGS. 2A-2B is a process flow diagram showing an example method of protecting objects.
Figure 2B:
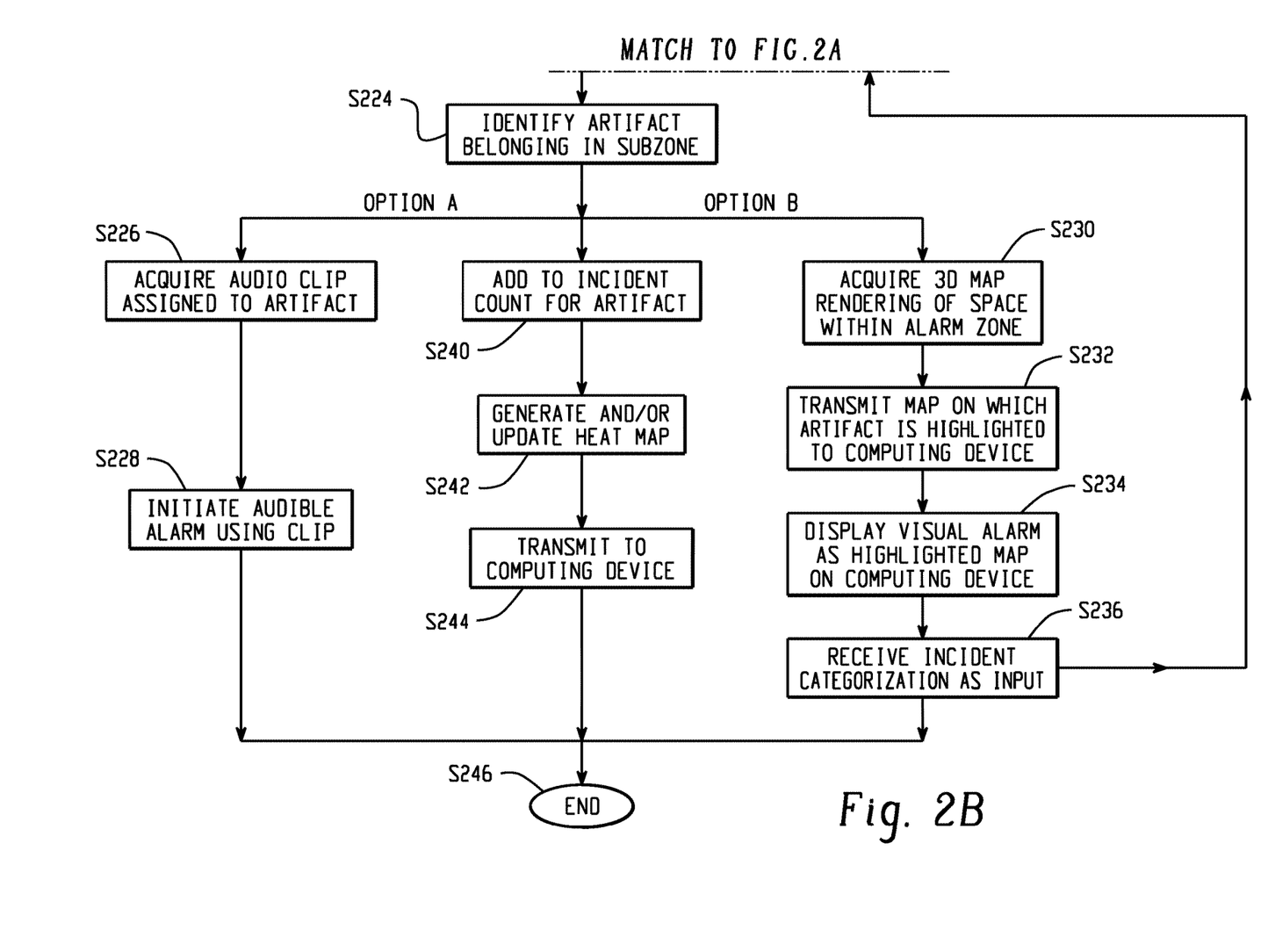

Now turning to FIG. 2A, FIGS. 2A-2B are a process flow diagram showing an example method of protecting objects. The method starts at S202. The operation relies on cameras or sensors 104a, . . . n being strategically placed in a facility to surveil a space in which at least one object is held, for example, on exhibit. For ease of description and illustrative purposes, the facility can be a museum and the space can be a gallery room in which at least two objects are held. In the contemplated embodiment, at least one monitor 104 is placed within the space in a position that allows for it to monitor the objects within the space. Typically, two monitors are placed within the space with their primary focus being on the surveillance of movement (e.g., by persons) or conditions (e.g. environment) surrounding the object(s)-of-interest. This can require, for example, a unique placement strategy for the monitors so that the object(s) can be observed—without obstruction or noise—within the monitor's field of view. In one example, monitors can be placed in opposite corners of a room in which the object is held.

For each monitor, a predefined region of interest ("ROI" or "alarm zone") is determined within the field of view or measurement. At S204, the predetermined ROIs can be acquired from a database 130 in communication with the computing device 102.

One aspect of the disclosure is that it is operative to identify the object—among multiple objects—involved in an incident. In conventional approaches, guards are stationed throughout gallery spaces and one guard may be covering two or more rooms or areas. Guards are responsible for monitoring all objects and patrons in an area. In conventional surveillance approaches, guards in a control room may also monitor video data received from cameras in the area. Camera motion alarming can sometimes detect motion in a particular area within the camera view, but it cannot detect an incident on an object-by-object basis.

One aspect of the present disclosure is that it increases granularity to an object level. This allows for reporting (for example, to security personnel) of actual objects that are affected by incidents. To achieve this, the present disclosure introduces granular alarm zones (hereinafter referred to as "subzones" or "freeform zones") that are each configured to an object—i.e., tuned on a per object basis. Multiple subzones are defined within the alarm zone, and each subzone functions independently from the other subzones. These subzones can be defined as part of a preprocessing or calibration operation and stored within the database 130. As part of this operation, an individual freeform drawing can define the subzone. There is no limitation made to the shape and size of each zone. Any number of uniquely shaped freeform zones can be assigned to each alarm zone. The fine resolution of the disclosed object-based alarming-capability allows for additional alarm overlay drawing capability. At S206, the system 100 acquires the predetermined freeform zones from the database 130.

Also stored in the database 130 is information relating to a subzone, such as the object belonging to the subzone; a set of thresholds assigned to the subzone; a unique alert or alarm, such as an audio clip and/or name associated with it, that initiates when the subzone is breached; links between the object and its location on a 2D or 3D map of the space; and a timetable, etc. Each subzone can also be assigned a name or title, or it can be referred to by the title of the object within it. In the contemplated embodiment, different subzones or subzone overlays can be created and scheduled for different times of day or different days a week, etc. An example instance might be, for example, when a gallery is open for guided (including larger crowds) or self-guided (including fewer persons) tours during specific or limited hours a day/week and/or when there may be varying risks of incidents. By this, during certain periods, an object may belong to a monitored subzone within the alarm zone and, during other periods, the object may belong to just the alarm zone being monitored. Therefore, in one embodiment, the system may acquire the predetermined freeform zones at S206 using the timetable stored in database 130.

At S208, the system (or detector 112) monitors the scene. The server computer or central computing device 102 acquires image(s), frames or signals (measurements) from the at least one camera or sensor 104. The detector 112 searches for a change in a subzone. This change is detected as an incident at S210. In one embodiment, the method can proceed to S224. However, in some embodiments, filtering operation(s) are first employed to verify that the potential incident is a touch incident. The disclosed system desires to filter out false detections due events such as lighting changes in the gallery space, etc. To accomplish this, the system can perform a verification or filtering operation on the detection, which is a candidate incident until a verification is completed.

In one example, the system 100 can determine if the change is a result of a lighting change in the space. In the conventional video-based approach, lighting changes are one of the major triggers of false alarms. False alarms can occur when gallery lights are turned on or off; when flash photography is used; and when clouds or other outside conditions affect skylights, etc. In the conventional approach, cameras try to automatically compensate for changes in lighting using white balance throughout the entire video image. This makes robust alarming difficult to execute.

The disclosed embodiment reduces false alarms by filtering the potential incidents that result from changes in light conditions. The filtering is performed for each camera (instead of subzone) belonging to the system. Each camera is set up and configured to automatically adjust parameters using, for example, a tuning software. Using a blank area on a wall or ceiling, a target zone is configured. In other words, an initial background color or intensity is determined for the target zone at S212. The blank area or background area is selected in which no human activity occurs. The same or different camera monitors the target zone. The system searches for changes in the target zone.

In response to a change being detected in the target zone (YES at S214), the change (potential incident) detected in the subzone at S210 is assumed to be (i.e., result from) a change in lighting and the potential incident is discarded at being a false detection at S222. The system can also periodically update the background color associated with the target zone and adjust parameters accordingly. In this manner, the system is operative to filter out the false alarms associated with detected changes in lighting. In response to no change being detected in the target zone (NO at S214), the candidate incident is assumed to be a contact or touch incident. The detected change is signaled as a verified incident at S216.

Continuing with FIG. 2A, alternative or additional filtering and/or verification operations can be optionally performed. In one example, a classifier 114 can be employed to determine if the detected candidate incident is a touch/contact incident or a shadow (no contact) incident. The classifier 114 can be a deep learning classifier such as, in one non-limiting example, a neural network. In the contemplated embodiment, an adaptive algorithm learns from a training or historical dataset of classifications. The training dataset is generated at S238 using previous alarm incidents that were reported for objects. In one embodiment, each incident is or was categorized as a positive (actual contact) or a false positive (someone getting too close; reflection; shadow; or lighting change). Each positive and/or false positive can be further categorized by the reason (e.g., the reflection, shadow, etc.). In one embodiment, the initial training set can be built using categorizations that are manually determined. For example, a classification is made for actual alarm incidents that were reported to personnel for assessment. These classifications are made and stored in the training set. The training set grows as more images become available over time. The classifier 114 is tuned as well over time as the training set grows.

Where the monitor includes a camera, the image(s)—in which the detected change is observed—is applied to the classifier 114 at S218. The classifier generates an output classifying the change as positive (valid) or false positive. In response to the classifier 114 determining that the detected change is a false positive (i.e., not a contact incident, such as a shadow, etc.) (NO at S220), the incident is discarded at being a false detection at S222. In response to the classifier 114 determining that the detected change is a positive (valid) (YES at S220), the method proceeds to S224. The disclosed system uses the training and/or historical dataset (including the images of incidents and categorization of each image/incident) and deep learning technology to determine a severity level of the reported incidents. By this, the system is operative to tune the classifier to filter out detections that result from noise, such as shadows and reflections. One aspect of this classification (over conventional approaches) is that it reduces and/or eliminates the occurrences of false alarms.

Turning to FIG. 2B, when an incident is detected or an incident is signaled, the output module 118 generates and/or updates a report of the incident. When the object is contacted or tampered with, security personnel are alerted immediately. However, details regarding the incident are absent in the conventional approach, which employs cameras for general surveillance. However, security personnel need to react quickly. Therefore, an improved approach is desired.

First, the object belonging to the subzone in which the change was detected is identified at S224. This stored object information is acquired using the database 130. An alarm or notification can be generated to immediately alert security personnel. This alarm or notification can be an audible or a visual alert. In one embodiment, a unique audio clip (associated with the object) may also be acquired from the database at S226. The output module 118 can initiate an audible alarm using the clip at S228. The output module can transmit the audio clip to the output device 124, such as a speaker or a computing device having a speaker, which plays the audio clip. In another contemplated embodiment, the map (associated with the alarm zone) can be acquired from the database at S230. In a different embodiment, links between the subzones and the space are stored in and acquired from the database. These links can be used to generate the map, which can be a 2D or 3D rendering of the space in which the alarm zone is located. The links and map are employed by the system to provide an output device with real-time information regarding the exact space, location and object involved in the incident.

More specifically, in one embodiment, the output module 118 can generate a visual display including a real-time map on which the object or subzone is highlighted. The output can map each camera's multizone overlay directly to an object shown on the rendering of the space. When an incident is detected, the object on the 2D or 3D rendering is marked in an alarm state and transmitted to a computing device (e.g., handheld computing unit or server computer) at S232 so that security personnel can respond to the incident. This output is displayed on the computing device at S234 and can include, in one example, highlighting or similar emphasizing or (or any similar visual indicator on) the object in the map. This form of visual output allows personnel to identify the actual object and/or location of the subzone. Furthermore, in one embodiment, additional information involving the object details can be retrieved from the database 130 in response to the user entering a command at the GUI 128. One instruction can be submitted by, for example, receiving a selection associated with the incident, subzone, alarm zone or object through the GUI.

One aspect of the disclosure is that it identifies the object involved in an incident, which allows users to inspect the object for damage. The graphical user interface of the present disclosure allows users to simply select (by clicking on, in one example) the object in the 2D or 3D rendering of the space. Selection of the object allows the user to review video frames of, or condition measurements associated with, the current incident or any previously recorded incidents for that object. And, by this video and interface, the user can identify the source of any damage.

In addition to the real-time map, the disclosed system is also operative to update the classifier at S238 using the incident. This updating can be accomplished automatically or manually. In one embodiment, the incident is categorized at S236 and the image and incident information are added to the historical or training dataset. In the manual approach, the system receives categorization information through the GUI. Selected ones or all incidents can be categorized.

Continuing with FIG. 2B, the disclosed system can also use the historical dataset to generate a heat map, and/or use the incident identified at S224 to update the heat map. The contemplated map can include a color-coded heat mapping of past incidents on a 2D or 3D rendering of the space. This allows the incidents to be reviewed in response to the objects being selected, through an application, on the map of the space, such as a gallery floor. In one embodiment, a count is associated with each object. In response to an incident, one "1" is added to the count at S240. The counts (i.e., number of incidents associated with each object) are used to generate and/or update the heat map at S242. The heat map is transmitted to the output device at S244 for display. At the output device, the heat map provides an application that allows personnel to access a historical summary or report of incidents in a simple, easy-to-use, graphical interface. Security personnel can easily identify hot spots during specific times of day. This information can be used for positioning guards in the area. A heat map may show that incidents elevate during certain times or days. In an illustrative example, a history of elevated incidents (touching) may occur during group tours in the space. As determined from this map, users of the system may station a guard during the group tours. The method ends at S246.

One aspect of the disclosure is that it enables users to quickly identify individual objects that are at the greatest risk of being touched and/or damaged by contact. By this, users can take proactive steps to protect the objects from future harm. Additionally, the graphical user interface of the present disclosure allows users to simply select (by clicking on, in one example) the room or gallery space. The visual heat map display allows the users to identify the objects that are contacted the most frequently. Selection of the object allows the user to review each incident. And, by this interface, the user can make decisions on whether changes need to be made.

Another aspect of the present disclosure is that it allows facility personnel to graphically review historical incident information including frequency and peak time periods on a per object basis. For the user, this information provides valuable insight for the design, placement and location of objects in future exhibits.

Figure 3:
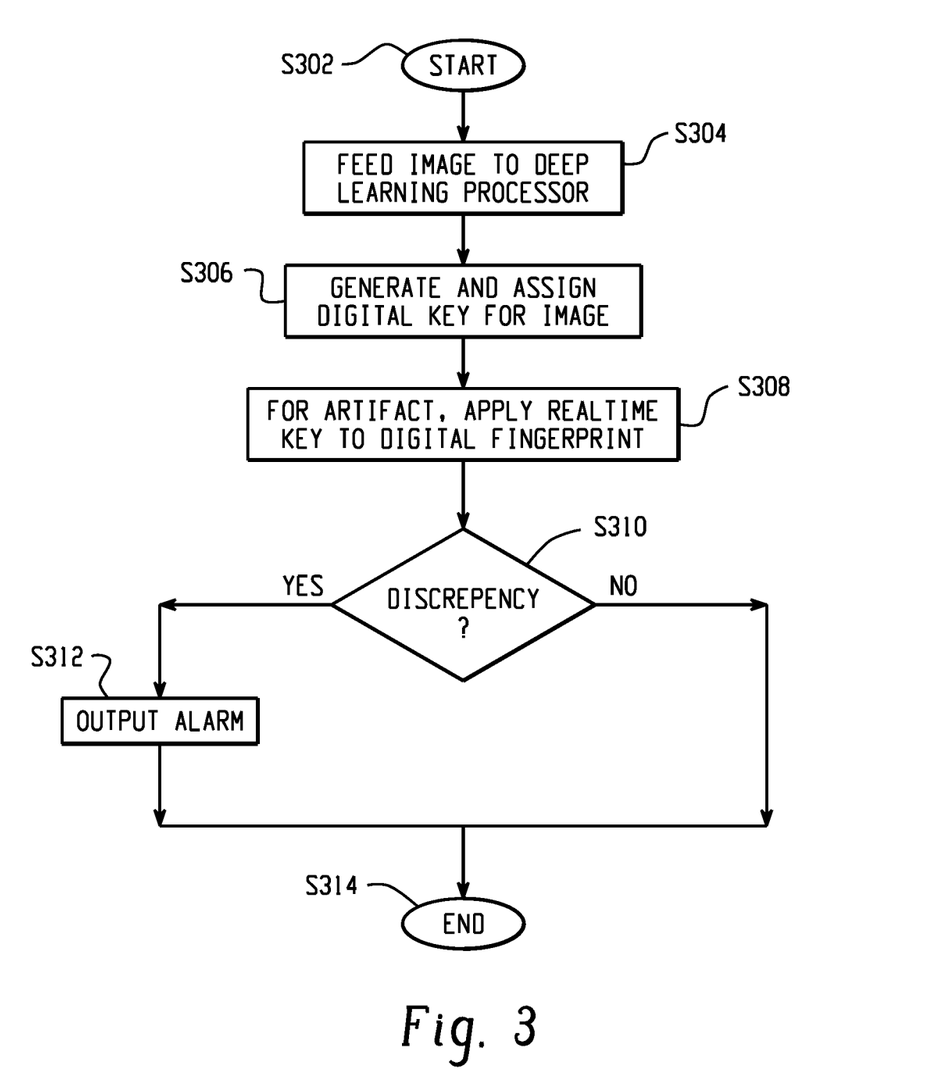
FIG. 3 is a process flow diagram showing an example method of protecting objects.

Now turning to FIG. 3, FIG. 3 is a process flow diagram showing an example method of protecting objects. This operation can be performed in addition to, or in alternative to, the method disclosed in FIGS. 2A-2B. This approach is based in artificial intelligence ("AI") and employs digital fingerprints to determine if the object is in its intended staging or position, or more specifically, is present. Every object is assigned at least one digital fingerprint, but more preferably is assigned numerous digital fingerprints each associated with a different lighting condition in the space holding the object. Using this fingerprint(s), the system immediately alerts personnel if it determines that the object is not present.

The method starts at S302. The approach of FIG. 3 employs the multiple subzone functionality described in connection with steps of FIGS. 2A-2B and specifically in connection with S204-S208 that allow each object to be alarmed independently of other objects. The system (or detector 112) monitors the scene. The server computer or central computing device 102 acquires image(s) or frames or measurements from the at least one camera or sensor 104. The detector 112 feeds a selected one or all images into a deep learning processor 116 or neural network at S304. The images can be selected from every $n^{th}$ image in a predetermined periodic approach. Or the images can be selected at specific predetermined times, hours, or minutes of the day. In one embodiment, the detector 112 can crop the image to generate at least one subimage(s) of a subzone. One aspect of this approach is that the subimage contains only the details pertaining to the single object belonging to the subzone. When the current subimage is fed to the deep learning processor 116, the processor 116 returns a digital key for the subimage (i.e., the object) at S306. In a preprocessing step, each object is associated with a reference image that has a unique fingerprint. For the object of interest, the current digital key is applied to the digital fingerprint at S310 to determine if the object is at its proper position and location.

This is performed by comparing the key and the fingerprint to determine if there are any discrepancies. In response to a discrepancy being detected between the key and fingerprint (YES at S310), the system immediately signals security by, for example, outputting an alarm at S312. The system can be instructed to perform this verification immediately when restarting and returning the system to operational status after it has been down. In this manner, the system can check every object in the facility to verify that no object has been removed or shifted from its location. Should the fingerprint operation verify that the object has not been moved, the subimage and/or information relating thereto can be manually or automatically fed back into the system for self-tuning. The method ends at S314.

One aspect of the present system is that it provides continuous monitoring of objects of value and real-time object-based alarming of incidents relating to when an object is contacted. Over time, historical incident information allows users of the system to manage the objects' protection by providing information on the objects at highest risk of incident.

Another aspect of the disclosed audible alert device is that the audible output can be played from speakers or a device in the room near the subzone. This way, the offending person/visitor can be notified of a violation of a no-touch policy. This is designed to modify unacceptable behavior. This can also enhance the visitor experience by avoiding stressful confrontations with security forces.

One technical improvement of the present system over existing approaches is that it reduces computational load on a daily, weekly, or yearly basis by reducing and/or eliminating the image processing in regions (e.g., canvas areas) outside of the subzones. By focusing the majority of the processing to only the pixel regions within the subzones, the system greatly reduces the amount of processing to be performed on a routine basis. An additional technical improvement is that the system reduces the overall computational load during periods of lower risk of incident. The historical incident information allows the system to identify the periods of heightened risk of incident on a per object basis. By employing a (dynamic) timetable and dynamically monitoring objects—in varying or overlapping freeform zones during different times of day—the system can reduce the amount of processing that conventional systems use.

Another technical improvement of the present disclosure is that it fine tunes the dataset over time to improve the accuracy of the output. By filtering and/or discarding images associated with noise, such as, changing light conditions, reflections, or shadows, the system improves the dataset and reduces and/or eliminates false positives.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A computer-implemented method for protecting objects, the method comprising:
   at a server computer:
      acquiring at least one image or measurement from at least one monitor in communication with the server computer, the at least one monitor monitoring a zone in which at least one object is held;
      determining subzones within the zone, each object belonging to a subzone;
      monitoring the zone for an incident using the at least one image or measurement;
      in response to an incident being detected within a subzone, identifying an object belonging to the subzone;
      generating an alarm output unique to the object; and
      transmitting the output to an output device in communication with the server computer.

2. The method of claim 1 further comprising:
   acquiring a stored timetable from a database in communication with the server computer; and
   determining the subzones for a current time using the timetable;
   wherein the subzones are dynamic across different times of a day or week.

3. The method of claim 1 further comprising:
   using at least one image from the monitor, determining at least one of current color and intensity from a background in the zone;
   acquiring a stored color or intensity of the background;
   in response to a change between the current color and background color meeting or exceeding a predetermined threshold, discarding the incident as an anticipated change of lighting condition; and
   in response to a change between the current color and background color not meeting or exceeding a predetermined threshold, signaling an alarm.

4. The method of claim 3, wherein the background is a blank portion of a wall or ceiling.

5. The method of claim 1 further comprising:
   applying the at least one image or measurement to a classifier, the classifier classifying the incident as being one of a positive and false positive.

6. The method of claim 5, wherein the positive includes a contact incident; and wherein the false positive includes a shadow or no contact incident.

7. The method of claim 5 further comprising:
   in response to the image or measurement being classified as a false positive, discarding the incident as a no contact incident.

8. The method of claim 1 further comprising:
   acquiring a stored audio clip assigned to the object; and
   initiating an audible alarm using the clip;
   wherein each object in the zone is assigned to a different clip.

9. The method of claim 1 further comprising:
   acquiring a map rendering of a space within the zone;
   highlighting the object on the map; and
   transmitting the highlighted map to a computing device.

10. The method of claim 1 further comprising:
    before the monitoring, building a classifier to include a training set of images, each training image belonging to a type of incident;
    in response to an incident being detected within a subzone, applying the image to the classifier;
    generating a category of the incident from the classifier; and
    discarding the incident or signalizing the alarm based on the category.

11. The method of claim 1 further comprising:
    building a classifier using an image, wherein the building includes receiving input categorizing the incident in the image.

12. The method of claim 1 further comprising:
    building a table counting a number of incidents for each object in the zone;
    generating a heat map for the zone, the heat map representing the objects based on number of incidents.

13. The method of claim 1 further comprising:
    generating a current digital key for an image in which the object is captured;
    acquiring a stored digital fingerprint for the object;
    applying the key to the digital footprint;
    in response to a discrepancy between the current key and stored digital fingerprint, signaling an incident.

14. The method of claim 13 further comprising:
    in response to the incident being signaled, searching the image for all objects in the alarm zone;
    determining if the all objects are present;
    in response to at least one object being detected as missing in the at least one image, initiating an alarm.

15. The method of claim 1, wherein the output device is a handheld computer.

16. The method of claim 1, wherein the subzones are freeform zones each encompassing an object.

17. The method of claim 1, wherein an object includes an artifact or artwork.

18. A system, comprising:
    a non-transitory storage device having stored thereon instructions for
    acquiring at least one image or measurement from at least one monitor, the at least one monitor monitoring a zone in which at least one object is held;
    determining subzones within the zone, each object belonging to a subzone;
    monitoring the zone for an incident;
    in response to detecting a change within a subzone, applying the at least one image or measurement to a classifier;
    classifying the incident as being one of a contact incident and non-contact shadow incident;
    in response to the incident being a contact incident, identifying an object belonging to the subzone;
    generating an alarm output unique to the object; and
    transmitting the output to an output device.

19. A system for protecting objects, comprising:
    a non-transitory storage device having stored thereon instructions for:
       acquiring at least one image or measurement from at least one monitor, the at least one monitor monitoring a zone in which at least one object is held;
       determining subzones within the zone, each object belonging to a subzone;
       monitoring the zone for an incident;
       in response to an incident being detected within a subzone, identifying an object belonging to the subzone; and
       generating an alarm output unique to the object;
       transmitting the output to an output device in communication with the server computer; and
    at least one hardware processor being part of the server computer and configured to execute the instructions.

* * * * *